June 23, 1970 M. F. MALM 3,517,315

MOBILE TELEPHONE TRANSMITTER SELECTOR CIRCUIT

Filed June 21, 1967 2 Sheets-Sheet 1

INVENTOR
MARVIN F. MALM
BY
ATTORNEY

June 23, 1970 M. F. MALM 3,517,315

MOBILE TELEPHONE TRANSMITTER SELECTOR CIRCUIT

Filed June 21, 1967 2 Sheets-Sheet 2

United States Patent Office 3,517,315
Patented June 23, 1970

3,517,315

MOBILE TELEPHONE TRANSMITTER SELECTOR CIRCUIT

Marvin F. Malm, Milan, Tenn., assignor to International Telephone and Telegraph Corporation, New York, N.Y., a corporation of Delaware Filed June 21, 1967, Ser. No. 647,747
Int. Cl. H04b 7/08; H04m 3/00
U.S. Cl. 325—54 7 Claims

ABSTRACT OF THE DISCLOSURE

A number of radio telephone stations are spread out along a train track in order to provide radio link channels for telecommunication with the train. All receivers listen for telephone signals received from the train via the radio links. The receiver of the strongest signal turns on, and, responsive thereto, its associated transmitter also turns on. In overlap zones, where two reecivers receive signals having the substantially same strength, timers operate to prevent oscillations of transmitters turning each other on and off.

This invention relates to mobile telephone systems and more particularly to systems for selecting one of many transmitters for broadcasting voice messages to mobile stations mounted on vehicles which may travel at high speeds.

The initials IMTS or MJ are often used to identify a mobile telephone system which is now in widespread use. This system normally utilizes one land based transmitter and many land based receivers for providing radio telephone links between a land based telephone network, of the public utility variety, and the many mobile stations. Because it is land based where power is easily obtainable, the transmitter may transmit at very high power levels so that it can broadcast the telephone voice signals over the entire area served by the IMTS system. However, the mobile transmitters generally work off the auto battery; hence, the mobile transmitted signals are not as powerful as the land base signals. Therefore, many receivers are scattered over the area served by the system, and the land based equipment selects the particular receiver which receives the strongest signal. As the auto moves about, the system switches from receiver to receiver.

The described IMTS or MJ system is in widespread use. Therefore, any newly developed systems must be compatible with it.

The original IMTS or MJ system was designed for use with autos which are not likely to travel at excessive speeds, at least not while the telephone is in use. Now, however, efforts are being made to develop very high speed trains which may travel at speeds of, say 175–200 miles per hour. The switching problems are much different when connections are required to be maintained with an auto traveling at, say 50 m.p.h., and a train traveling 175 m.p.h. For example, the train travels out of the range of both the transmitter and the receiver. Therefore, it becomes necessary to switch transmitters. Thus, there are the conditions which may set up an oscillatory switching wherein the receivers and transmitters turn themselves off and on—not because of the position of the mobile station, but because of the interaction between transmitter and receiver.

Accordingly, an object of the invention is to provide new and improved mobile telephone systems. A further object is to simplify the switching equipment and thereby reduce its costs. Here, an object is to preserve compatibility with existing equipment while accomplishing these and other objects.

A further object of the invention is to provide means for selecting the radio station which serves a track section having a high speed train thereon. Here an object is to prevent an oscillation wherein receivers and transmitters switch each other off and on.

In keeping with an aspect of the invention, all of the radio receivers distributed along the right-of-way of a high speed train track monitor the voice signal which is transmitted from the train. The signal which is received from the train is continuously applied to a difference amplifier having one input for each track receiver. An output from this difference amplifier continuously indicates and identifies the receiver which is then receiving the strongest train sent signal. The transmitter associated with the identified receiver is turned on so that it transmits the telephone signals originating at a land based station to the train. A number of timers are provided to prevent the transmitters and receivers from responding during certain critical periods while oscillatory conditions exist in the overlap zones where two receivers are likely to receive signals of approximately the same strength.

The above mentioned and other features of this invention and the manner of obtaining them will become more apparent, and the invention itself will be best understood by reference to the following description of an embodiment of the invention taken in conjunction with the accompanying drawings, in which.

Figure 3:
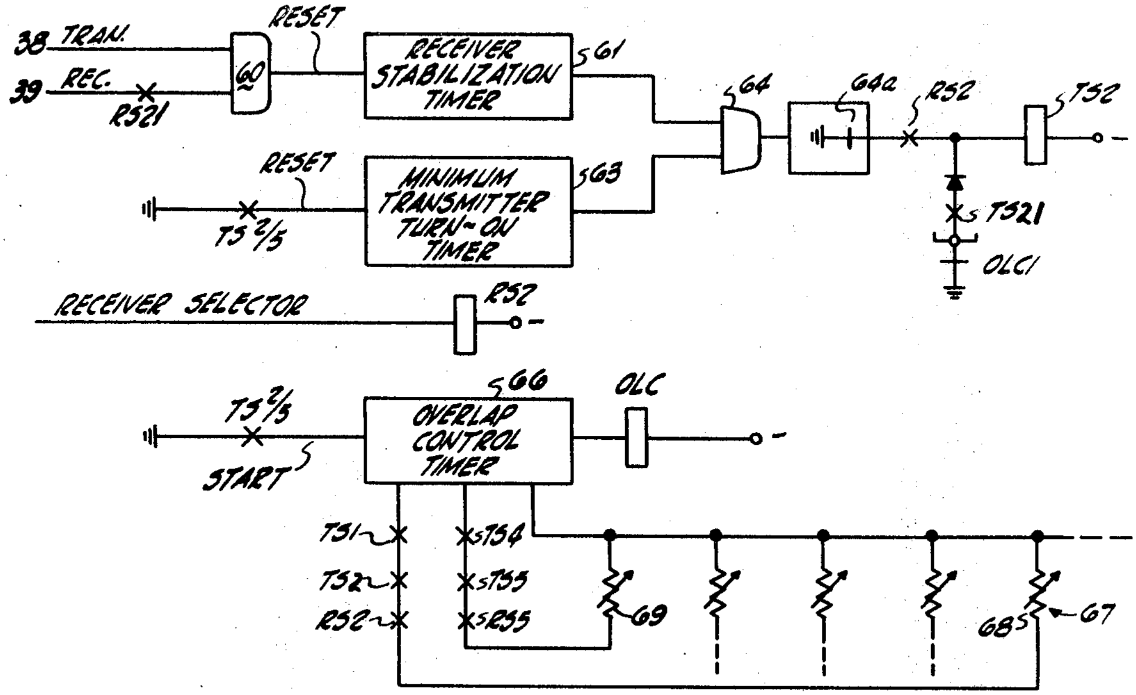
Figure 4:
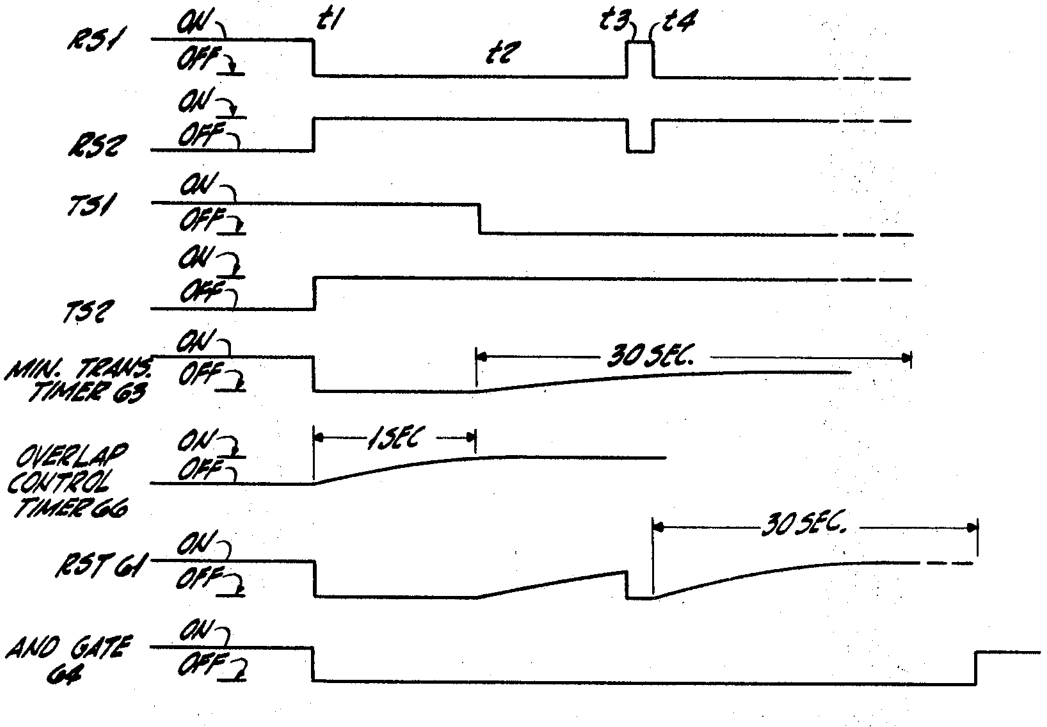

FIG. 3 schematically shows the various timers utilized to prevent the oscillatory conditions which are set up by a transmitter selection; and FIG. 4 is a timing chart which illustrates the manner in which the circuits of FIG. 3 operate.

A high speed train 30 (FIG. 1) is shown as racing down a track 31 at an extremely high speed, such as 175–200 m.p.h., for example. A number of radio stations 32 are located along the right-of-way to provide the radio links necessary for giving the mobile telephone service. Each of these radio stations is connected via any suitable form of land lines (symbolically indicated by telephone poles, such as 33) to a train sensor circuit 34. The sensor circuit 34 operates a selector device 35 to select the particular radio station which is adjacent the track section where the train is then located. That radio station is coupled through the selector 35 and over a line 36 to a land based station (not shown) where the telephone circuit may be completed through a conventional public utility switching system to a called subscriber.

Each of the radio stations S1, S2, S3 . . . SN includes a transmitter and a receiver, symbolically represented by the transmit and receive antennas 38, 39, respectively. The train also carries a radio transmitter and receiver, as indicated by the antennas 41, 42 respectively. Each of the land based stations 32 clearly serves a vast stretch of the track, as the station S1 is shown serving the track section 43.

Figures 1, 2:
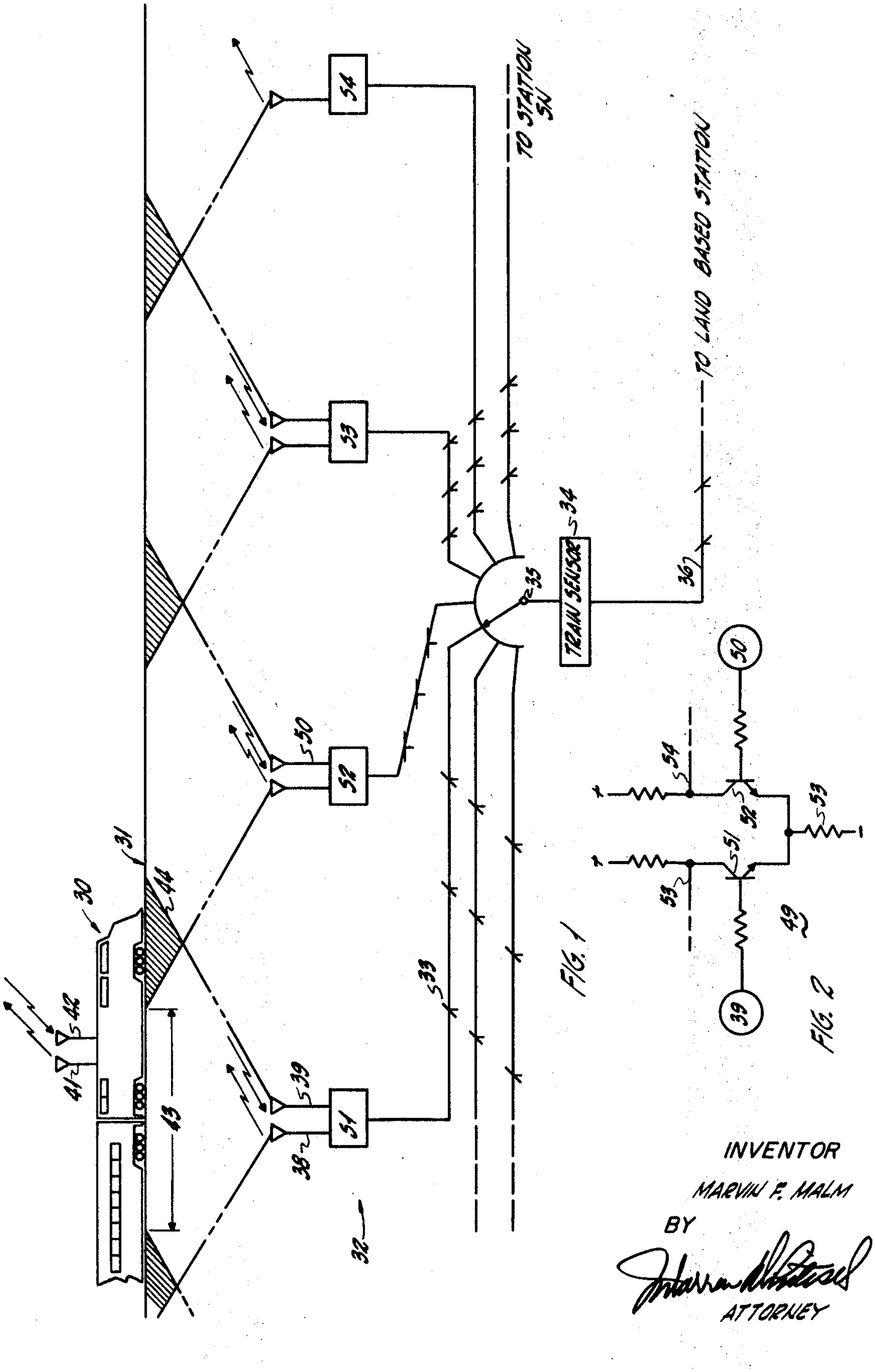
FIG. 1 is a schematic representation of a high speed train track and the telephone equipment located along its right-of-way.
FIG. 2 shows a difference amplifier for making a receiver selection.

In addition, there are overlap zones where adjacent land based radio stations transmit and receive signals having substantially the same strength so that the identity of the pertinent radio station is ambiguous. FIG. 1 shows these overlap zones by means of cross-hatched areas, one of which is numbered 44. For example, as FIG. 1 is drawn, the radio equipment on train 30 has been, and still is, transmitting to and receiving from the station S1, as indicated by the position of the selector switch 35. However, the train has entered into the overlap zone 44. Therefore, it will soon be necessary for the sensor 34 to step the selector 35 one step where it will turn off the transmitter of station S1 and turn on the transmitter of station S2.

Briefly, the train sensor 34 includes a difference amplifier 49 (FIG. 2) coupled between the receiving antennas 39, 50 of the radio stations S1, S2, respectively. While the difference amplifier may take any suitable form, it is here shown as a pair of NPN transistors 51, 52 having a large common emitter resistor 53. Voltages having magnitudes which represent the strength of the signals received at the receiving antennas 39, 50 are applied to the bases of the transistors 51, 52, respectively. The transistor receiving the highest bias turns on and draws substantially all of the current which can pass through the large resistor 53. Thus, for example, if the signal from the antenna 39 is stronger than the signal from the antenna 50, the transistor 51 turns on and the transistor 52 turns off. The output voltage at 53 is negative, and the voltage at 54 is positive. These output signals are applied to control equipment which turns on the transmitter at the station S1 and turns off the transmitter at the station S2. After the train 30 travels a little further, the antenna 50 receives the stronger signal, the transistor 51 turns off, and the transistor 52 turns on. The resulting signals at 53 and 54 are applied to equipment which switches the transmitter at station S1 off and at station S2 on.

The foregoing paragraph describes a desired operation. However, the train 30 is still in the overlap zone 44, and there could be a slight fading in the signal strength at the antenna 50. Without a control, the transistor 51 turns on and the transistor 52 turns off to switch the transmitters back to their original conditions. This could result in an oscillatory condition of radio stations turning the transmitters off and on, creating undesirable noise and interference at the mobile receiver.

According to the invention, a number of time relationships are provided for effectively eliminating the ambiguity of the switching signals in the overlap zones. The nature of these time relationships should become more apparent from a study of FIGS. 3 and 4. Normally, both the transmitter and receiver of the same station are operating at any given time. However, when the train moves out of zone of station S1, the receiver 50 receives a signal which is stronger than the signal that is received at the receiver 39. Thus, the receiver 39 turns off. There is now a mismatch wherein the receiver 39 is off in the station S1 where the transmitter 38 is on. This starts a timer and switches on the transmitter in the station S2 where the receiver 50 is turned on. During the timed interval immediately following, the transmitter switching circuit is inhibited so the transmitters cannot respond in the normal manner to a stronger receiver signal. After the danger of oscillatory switching has passed, the timer times out, and normal transmitter switching can occur.

In greater retail, assume that the train 30 has been passing through the track section 43. The transmitter 38 at station S1 has been transmitting, and the receiver 39 has been receiving. Since the transmit antenna 38 is broadcasting, any suitable means applies a signal to the upper input of AND gate 60 (FIG. 3). Also, since the receive antenna 39 is receiving at the same station, any suitable means simultaneously applies a signal to the lower input of AND gate 60. The AND circuit 60 conducts and applies a continuous reset signal to a receiver stabilization timer 61 to prevent it from timing.

When the train leaves the track section 43 (FIG. 1)—time $t_1$, FIG. 4—the transistor 52 (FIG. 2) turns on to operate the relay RS2 (FIG. 3) for selecting the receiver 50 of station S2; a relay RS1 (not shown) releases for turning off the station S1 (curves RS1, RS2, FIG 4).

The contacts RS21 open to break the lowermost input to the AND gate 60, which turns off. When the AND gate 60 turns off at time $t_1$ (FIG. 4), the continuously applied reset signal is removed from receiver stabilization timer 61. The timer turns off (curve RST) and remains off for a control period of time which is long enough to permit the receiver selection circuit to stabilize. For example, FIG. 4 shows that the signal from receiver 50 fades slightly at the time $t_3$. The receiver 39 select relay RS1 re-operates and the receiver 50 select relay RS2 releases. The AND gate 60 comes back on when contacts RS21 reclose. This starts the timer 61 again, as shown by the curve RST at time $t_3$. However, the signal from the receiver 50 soon (time $t_4$) comes back to full strength, and it is selected again. The AND gate 60 turns off and restarts the timer 61 once more at the time $t_4$. However, the arrangement is such that the transmitter selection cannot change as long as the receiver stabilization timer 61 is measuring a period of time. As seen in FIG. 4, the timer 61 cannot time out unless the receiver selection has been stable for a period of at least thirty seconds. Hence, the fact that relay RS1 operated at time $t_3$ has no significance.

When the receiver 50 turns on at time $t_1$, its transmitter also turns on, as shown by the transmitter select curve TS2. Since the transmitter at station S1 is also on, as shown by the transmitter select curve TS1, there are two or more transmitters turned on, and the multiple contacts TS2/5 are closed. This causes a reset signal to be applied at the input of the timer 63 to prevent it from beginning to measure a minimum transmitter turn-on time, as shown by curve "MIN. TRANS." in FIG. 4. Thus, timer 63 cannot begin to measure a period of time as long as two transmitters are on at the same time, and the multiple contacts TS2/5 are closed.

At time $t_2$, the transmitter 38 at the station S1 turns off, and there are no longer any closed multiple contacts TS2/5. The timer 63 begins to measure a thirty second period, during which no other transmitter may turn on.

During the period while the timers 61, 63 are measuring their respective time periods, the AND gate 64 is turned off. After both of the timers have timed out, the AND gate 64 conducts. When the AND gate 64 turns off at time $t_1$, contacts 64*a* close and ground is applied through contacts RS2 to operate the relay TS2 for selecting the second transmitter, at station S2. Once the relay TS2 operates, time $t_1$, contacts TS21 close to hold the relay TS2 operated under the control of break contacts OLC1 on the overlap control relay OLC.

The overlap control circuit 66 is started at time $t_1$ when two transmitters are turned on at the same time to close the multiple contacts TS2/5. Each transmitter along the track has a separately associated adjustable resistor 67, uniquely adjusted to represent the characteristics of that particular transmitter. Therefore, if the switch is from a transmitter at station S1 to a transmitter at station S2, the relays TS1, TS2, RS2 are operated at the same time. This connects the specific resistor 68 to control the time period of the overlap control timer 66. Likewise, if the switch is from a transmitter at the station S4 to one at the station S5, for example, the relays TS4, TS5 and RS5 are operated at the same time. This connects the resistor 69 to control the timer 66, which may cause a time out period that is entirely different from the period caused by the inclusion of the resistor 68. In a similar manner, every other station has its own unique overlap timing period which is tailored to its own unique needs by the adjustment of the corresponding one of the resistors 67.

The overlap control timer 66 measures the time period required for all relays and other circuits to operate and for the turning on transmitter to come up to full power. After the overlap control timer times out, relay OLC opens contacts OLC1, and relay TS2 is allowed to respond in a normal manner.

While the principles of the invention have been described above in connection with specific apparatus and applications, it is to be understood that this description is made only by way of example and not as a limitation on the scope of the invention.

I claim:

1. A mobile telephone system for use in conjunction with high-speed vehicles comprising a plurality of radio stations scattered over a geographical area in which the vehicle may travel, means associated with each radio station for sensing the strength of signals received from said vehicle, means responsive to said sensing means for selecting the particular station which is then receiving the strongest signal, and switching means for preventing the stations from turning on and off in an oscillatory fashion in response to changes in the relative strength of signals from the vehicle, said switching means including a plurality of timer means for inhibiting further switching for measured periods of time following said selection of the particular station which is then receiving the strongest signal.

2. The system of claim 1 wherein each radio station includes a transmitter and a receiver, means for selecting and switching said receivers on and off responsive to the strength of the signal that is received from said vehicle, and means responsive to the selection of a receiver at one station while a transmitter is turned on at another station for switching off the transmitter at said other station and switching on the transmitter at said one station.

3. The system of claim 1 wherein one of said timer means measures a fixed period of time required for said receivers to stabilize immediately after switching has occurred.

4. The system of claim 1 wherein one of said timer means measures a fixed period of time following turn on which is required for said transmitter to come up to full power.

5. The system of claim 1 wherein one of said timers measures a period of time occurring during switching, said period being uniquely related to the characteristics of individually associated ones of said radio stations.

6. A high speed train telephone system comprising a plurality of radio stations along a track right-of-way, each radio station along the track including a transmitter and a receiver, at least one mobile station on said train, means for connecting said radio stations to a land based telephone network, means for establishing telephone calls between mobile stations on trains traveling along said track and said land based telephone network via said radio stations, and means responsive to said train leaving the track section served by one station for switching said calls to the station serving the track section being entered by said train, said last means including a train sensor means comprising a difference amplifier having a plurality of inputs, means for applying a voltage from each radio station receiver to an individually associated one of said inputs, the voltage so applied having a value which represents the strength of the signal being received at the radio station corresponding to the input at which the voltage is applied, means responsive to the outputs of said difference amplifier for selecting the receiver which is then receiving the strongest signal, and means responsive to the selection of a receiver at one station while a transmitter is turned on at another station for switching off the transmitter at said other station and switching on the transmitter at said one station.

7. The system of claim 6 and means responsive to the selection of a receiver for measuring a fixed time period during which no new receiver selection may be made, means responsive to the switching on of the transmitter at the station where the selected receiver is located for measuring a fixed time period during which no new transmitter selection may be made, and means for measuring an overlap time period during which no selections may be made, said overlap time period having a duration uniquely related to the characteristics of the radio stations where the receivers and transmitters are turning on and off.

References Cited

UNITED STATES PATENTS

| | | | |
|---|---|---|---|
| 2,590,234 | 3/1952 | Coxhead | 325—55 |
| 2,896,072 | 7/1959 | Bachelet et al. | 325—53 |
| 3,155,909 | 11/1964 | Shepherd | 325—304 |
| 3,328,697 | 6/1967 | Duncan et al. | 325—304 |

ROBERT L. GRIFFIN, Primary Examiner

J. A. BRODSKY, Assistant Examiner

U.S. Cl. X.R.

325—55, 56, 304; 179—1, 41